(12) United States Patent
Hull et al.

(10) Patent No.: US 7,652,555 B2
(45) Date of Patent: Jan. 26, 2010

(54) CONTAINER FOR STORING OBJECTS

(75) Inventors: Jonathan J. Hull, San Carlos, CA (US); Jamey Graham, San Jose, CA (US); Dar-Shyang Lee, Union City, CA (US)

(73) Assignee: Ricoh Company, Ltd., Tokyo (JP)

(*) Notice: Subject to any disclaimer, the term of this patent is extended or adjusted under 35 U.S.C. 154(b) by 81 days.

(21) Appl. No.: 10/235,032

(22) Filed: Sep. 3, 2002

(65) Prior Publication Data
US 2004/0041696 A1 Mar. 4, 2004

(51) Int. Cl.
*B60R 25/00* (2006.01)

(52) U.S. Cl. .............. 340/5.73; 340/572.8; 340/5.31; 340/5.32; 340/10.42; 340/5.33; 340/568.1; 340/568.2

(58) Field of Classification Search .......... 340/10.42, 340/568.1, 5.92, 572.1, 10.1, 10.3, 572.8, 340/5.31, 5.32, 568.2, 5.33; 235/375, 385; 345/156
See application file for complete search history.

(56) References Cited

U.S. PATENT DOCUMENTS

| | | | |
|---|---|---|---|
| 4,862,160 A | 8/1989 | Ekchian et al. | |
| 5,287,414 A | 2/1994 | Foster | |
| 5,666,490 A | 9/1997 | Gillings et al. | |
| 5,689,238 A | 11/1997 | Cannon, Jr. et al. | |
| 5,706,452 A | 1/1998 | Ivanov | |
| 5,732,401 A | 3/1998 | Conway | |
| 5,926,116 A | 7/1999 | Kitano et al. | |
| 5,933,829 A | 8/1999 | Durst et al. | |
| 5,936,527 A | 8/1999 | Isaacman et al. | |
| 5,939,981 A | 8/1999 | Renney | |
| 5,942,987 A * | 8/1999 | Heinrich et al. .......... 340/10.42 |
| 5,974,202 A | 10/1999 | Wang et al. | |
| 5,978,477 A | 11/1999 | Hull et al. | |
| 5,978,773 A | 11/1999 | Hudetz et al. | |
| 6,008,727 A | 12/1999 | Want et al. | |
| 6,055,544 A | 4/2000 | DeRose et al. | |
| 6,100,804 A | 8/2000 | Brady et al. | |
| 6,104,834 A | 8/2000 | Hull | |
| 6,108,656 A | 8/2000 | Durst et al. | |
| 6,122,520 A | 9/2000 | Want et al. | |
| 6,127,928 A | 10/2000 | Issacman et al. | |
| 6,130,621 A * | 10/2000 | Weiss .................. 340/5.28 |
| 6,176,425 B1 | 1/2001 | Harrison et al. | |

(Continued)

FOREIGN PATENT DOCUMENTS

CA 2354464 7/2003

(Continued)

OTHER PUBLICATIONS

"Hitachi Announces world's smallest RFID IC, the 'mu-chip,'" company press release, Hitachi Ltd. Tokyo, Japan (2001).

(Continued)

*Primary Examiner*—Vernal U Brown
(74) *Attorney, Agent, or Firm*—Townsend and Townsend and Crew LLP

(57) ABSTRACT

A container that is capable of outputting information related to objects stored in the container. The container is able to output information for objects that are stored by the container and that have identification tags physically associated with them.

35 Claims, 5 Drawing Sheets

U.S. PATENT DOCUMENTS

| | | | |
|---|---|---|---|
| 6,195,006 B1 * | 2/2001 | Bowers et al. | 340/572.1 |
| 6,199,048 B1 | 3/2001 | Hudetz et al. | |
| 6,204,764 B1 * | 3/2001 | Maloney | 340/568.1 |
| 6,232,870 B1 | 5/2001 | Garber et al. | |
| 6,249,226 B1 | 6/2001 | Harrison et al. | |
| 6,259,367 B1 | 7/2001 | Klein | |
| 6,260,049 B1 | 7/2001 | Fitzgerald et al. | |
| 6,262,662 B1 | 7/2001 | Back et al. | |
| 6,278,413 B1 | 8/2001 | Hugh et al. | |
| 6,294,998 B1 | 9/2001 | Adams et al. | |
| 6,297,737 B1 | 10/2001 | Irvin | |
| 6,304,182 B1 | 10/2001 | Mori et al. | |
| 6,307,473 B1 | 10/2001 | Zampini et al. | |
| 6,324,353 B1 | 11/2001 | Laussermair et al. | |
| 6,326,889 B1 | 12/2001 | Van Horn et al. | |
| 6,333,690 B1 | 12/2001 | Nelson et al. | |
| 6,335,685 B1 | 1/2002 | Schrott et al. | |
| 6,337,619 B1 | 1/2002 | Kowalski et al. | |
| 6,340,931 B1 | 1/2002 | Harrison et al. | |
| 6,341,931 B1 | 1/2002 | Bates | |
| 6,354,493 B1 * | 3/2002 | Mon | 235/380 |
| 6,359,628 B1 | 3/2002 | Buytaert | |
| 6,380,894 B1 | 4/2002 | Boyd et al. | |
| 6,427,032 B1 | 7/2002 | Irons et al. | |
| 6,430,554 B1 | 8/2002 | Rothschild | |
| 6,434,561 B1 | 8/2002 | Durst, Jr. et al. | |
| 6,442,563 B1 | 8/2002 | Bacon et al. | |
| 6,512,919 B2 | 1/2003 | Ogasawara | |
| 6,539,281 B2 * | 3/2003 | Wan et al. | 700/236 |
| 6,542,933 B1 | 4/2003 | Durst, Jr. et al. | |
| 6,651,053 B1 | 11/2003 | Rothschild | |
| 6,651,063 B1 | 11/2003 | Vorobiev | |
| 6,655,586 B1 | 12/2003 | Back et al. | |
| 6,675,165 B1 | 1/2004 | Rothschild | |
| 6,707,381 B1 * | 3/2004 | Maloney | 340/568.1 |
| 6,766,363 B1 | 7/2004 | Rothschild | |
| 6,801,907 B1 | 10/2004 | Zagami | |
| 6,825,753 B2 * | 11/2004 | Cardinale et al. | 340/5.73 |
| 6,860,422 B2 | 3/2005 | Hull et al. | |
| 6,865,608 B2 | 3/2005 | Hunter | |
| 6,892,376 B2 | 5/2005 | McDonald et al. | |
| 6,993,573 B2 | 1/2006 | Hunter | |
| 7,006,664 B2 | 2/2006 | Paraskevakos | |
| 7,129,840 B2 | 10/2006 | Hull et al. | |
| 7,357,300 B2 | 4/2008 | Hull et al. | |
| 7,424,974 B2 | 9/2008 | Hull et al. | |
| 7,506,250 B2 | 3/2009 | Hull et al. | |
| 2001/0047381 A1 | 11/2001 | De Meno et al. | |
| 2002/0032698 A1 | 3/2002 | Cox | |
| 2002/0032707 A1 | 3/2002 | Takeoka | |
| 2002/0113707 A1 | 8/2002 | Grunes et al. | |
| 2002/0147649 A1 | 10/2002 | White | |
| 2002/0176116 A1 | 11/2002 | Rhoads et al. | |
| 2003/0018669 A1 | 1/2003 | Kraft | |
| 2003/0102970 A1 * | 6/2003 | Creel et al. | 340/568.1 |
| 2003/0179908 A1 | 9/2003 | Mahoney et al. | |
| 2003/0191719 A1 | 10/2003 | Ginter et al. | |
| 2003/0214388 A1 | 11/2003 | Stuart et al. | |
| 2004/0017313 A1 | 1/2004 | Menache | |
| 2004/0041707 A1 | 3/2004 | Hull et al. | |
| 2004/0044956 A1 | 3/2004 | Huang | |
| 2004/0078749 A1 | 4/2004 | Hull et al. | |
| 2004/0079796 A1 | 4/2004 | Hull et al. | |
| 2004/0181756 A1 | 9/2004 | Berringer et al. | |
| 2004/0205455 A1 | 10/2004 | Dathathraya | |
| 2004/0257231 A1 | 12/2004 | Grunes et al. | |
| 2005/0035862 A1 | 2/2005 | Wildman et al. | |
| 2005/0105724 A1 | 5/2005 | Hull et al. | |
| 2005/0182757 A1 | 8/2005 | Hull et al. | |

FOREIGN PATENT DOCUMENTS

| | | |
|---|---|---|
| DE | 19646153 A1 | 5/1998 |
| EP | 794 507 B1 | 4/2004 |
| FR | 2782703 A1 | 3/2000 |
| JP | 08-050598 A | 2/1996 |
| JP | 08-101980 | 4/1996 |
| JP | 10-013642 A | 1/1998 |
| JP | 10-154229 A | 6/1998 |
| JP | 2001/052054 A | 2/2001 |
| JP | 2001/253517 A | 9/2001 |
| JP | 2002/046821 A | 2/2002 |
| JP | 2002-120475 A | 4/2002 |
| JP | 2002-522999 | 7/2002 |
| JP | 2002337426 | 11/2002 |
| JP | 4256748 B2 | 4/2009 |
| WO | WO 00/26856 A2 | 5/2000 |

OTHER PUBLICATIONS

"Workflow Management Coalition Workflow Standard-Interoperability Wf-XML Binding," The Workflow Management Coalition Specification. May 1, 2000, Version 1.0, Copyright 1999, 2000 The Workflow Management Coalition, pp. 4-40 (2000).

Allen "Workflow: An Introduction," *Workflow Handbook,* Workflow Management Coalition, pp. 15-38 (2001).

Kwon "Tiny Bay Area Invention Could Change Security," on-line article available at http://www.kpix.com, KPIX Channel 5, San Francisco, CA 94111-1597 (2001).

Want et al. "Bridging Physical and Virtual Worlds with Electronic Tags," In Proc. ACM CHI '99 pp. 370-377 (1999).

Want et al. "Expanding the Horizons of Location-Aware Computing," IEEE Computer 34:31-34 (2001).

Want et al. "Ubiquitous Electronic Tagging," IEEE Distributed Systems Online 1:1-6 (2000).

WC3®, "URIs, URLs, and URNs: Clarifications and Recommendations 1.0, Report from the joint W3C/IETF URI Planning Interest Group," downloaded from http://www.w3.org/TR/uri-clarification/ on Jun. 9, 2005.

Non-Final Office Action for U.S. Appl. No. 10/235,035, mailed on Mar. 13, 2006, 18 pages.

Notice of Allowance for U.S. Appl. No. 10/235,035, mailed on Aug. 28, 2006, 17 pages.

Notice of Allowance for U.S. Appl. No. 10/235,035, mailed on Dec. 8, 2006, 11 pages.

Non-Final Office Action for U.S. Appl. No. 10/235,035, mailed on Jun. 1, 2007, 13 pages.

Notice of Allowance for U.S. Appl. No. 10/235,035, mailed on Dec. 17, 2007, 9 pages.

Notice of Allowance for U.S. Appl. No. 10/235,035, mailed on Apr. 11, 2008, 10 pages.

Non-Final Office Action for U.S. Appl. No. 10/235,042, mailed on Jun. 23, 2005, 23 pages.

Final Office Action for U.S. Appl. No. 10/235,042, mailed on Mar. 8, 2006, 20 pages.

Interview Summary for U.S. Appl. No. 10/235,042, mailed on May 9, 2006. 9 pages.

Advisory Action for U.S. Appl. No. 10/235,042, mailed on Jun. 23, 2006, 4 pages.

Non-Final Office Action for U.S. Appl. No. 10/235,042, mailed on Nov. 7, 2006, 25 pages.

Final Office Action for U.S. Appl. No. 10/235,042, mailed on Jun. 15, 2007, 9 pages.

Final Office Action for U.S. Appl. No. 10/235,042, mailed on Oct. 18, 2007, 8 pages.

Notice of Allowance for U.S. Appl. No. 10/235,042, mailed on Nov. 30, 2007, 6 pages.

Notice of Allowance for U.S. Appl. No. 10/235,042, mailed on Jan. 8, 2009, 6 pages.

Non-Final Office Action for U.S. Appl. No. 10/235,028, mailed on Feb. 1, 2006, 21 pages.

Final Office Action for U.S. Appl. No. 10/235,028, mailed on Sep. 7, 2006, 20 pages.
Non-Final Office Action for U.S. Appl. No. 10/235,028, mailed on Apr. 4, 2007, 19 pages.
Non-Final Office Action for U.S. Appl. No. 10/235,028, mailed on Jan. 11, 2008, 16 pages.
Final Office Action for U.S. Appl. No. 10/235,028, mailed on Jul. 1, 2008, 15 pages.
Advisory Action for U.S. Appl. No. 10/235,028, mailed on Oct. 9, 2008, 4 pages.
Non-Final Office Action for U.S. Appl. No. 10/235,028, mailed on Jan. 16, 2009, 17 pages.
Non-Final Office Action for U.S. Appl. No. 10/235,028, mailed on Jul. 9, 2009, 18 pages.
Notice of Allowance for U.S. Appl. No. 10/235,030, mailed on Aug. 15, 2006, 26 pages.
Interview Summary for U.S. Appl. No. 10/235,030, mailed on Aug. 15, 2006, 1 page.
Non-Final Office Action for U.S. Appl. No. 10/234,414, mailed on Dec. 8, 2003, 13 pages.
Web pages from PaperClick.com printed from http://www.paperclip.com on Jun. 14, 2006.
Notice of Allowance for U.S. Appl. No. 10/234,414, mailed on Jun. 21, 2004, 11 pages.
Notice of Allowance for U.S. Appl. No. 10/234,414, mailed on Sep. 23, 2004, 9 pages.
Requirement for Restriction/Election for U.S. Appl. No. 10/996,805, mailed on Jan. 24, 2006, 4 pages.
Non-Final Office Action for U.S. Appl. No. 10/996,805, mailed on Jun. 7, 2006, 16 pages.
Non-Final Office Action for U.S. Appl. No. 10/996,805, mailed on Jan. 19, 2007, 14 pages.
Final Office Action for U.S. Appl. No. 10/996,805, mailed on Aug. 21, 2007, 11 pages.
Notice of Allowance for U.S. Appl. No. 10/996,805, mailed on Nov. 26, 2007, 12 pages.

* cited by examiner

CONTAINER FOR STORING OBJECTS

CROSS-REFERENCES TO RELATED APPLICATIONS

This application incorporates by reference the entire contents of the following applications and patents for all purposes:

(1) U.S. patent application Ser. No. 08/754,721, filed Nov. 21, 1996 which issued as U.S. Pat. No. 5,978,477;
(2) U.S. patent application Ser. No. 10/235,035 filed concurrently with this application;
(3) U.S. patent application Ser. No. 10/235,042 filed concurrently with this application;
(4) U.S. patent application Ser. No. 10/235,028 filed concurrently with this application;
(5) U.S. patent application Ser. No. 10/235,030 filed concurrently with this application;
(6) U.S. patent application Ser. No. 10/234,414 filed concurrently with this application;

BACKGROUND OF THE INVENTION

The present invention relates to containers for storing objects, and more particularly to a container that is capable of outputting information related to objects stored in the container.

Containers come in all shapes and sizes and are widely used to store objects. Examples of containers include: boxes, cabinets, cupboards, shelves, storage racks, etc. used in office environments to store a variety of objects including documents, books, stationery, and several other objects; a briefcase or bag used by a person; a toolbox used by a handyman to store tools, etc.; storage containers used for transportation purposes; and other types of containers.

A common problem shared by all containers is that there is no easy way of automatically determining the contents of a container. In order to determine the contents of a container, a user has to manually peruse through the objects stored in the container. This process of manually determining the contents of a container can be extremely time-consuming and frustrating, especially when a container stores several items. For example, it may take a user a lot of time to determine contents of a box of documents.

Several techniques have been developed to ease the task of determining objects stored in a container. However, most of these techniques still require significant manual effort and lack the automation and convenience desired by users. There is therefore a need for techniques that automate and simplify the task of determining the contents of a container.

BRIEF SUMMARY OF THE INVENTION

Embodiments of the present invention provide a container that is capable of outputting information related to objects stored in the container. The container is able to output information for objects that are stored by the container and that have identification tags physically associated with them.

According to an embodiment of the present invention, a container is provided comprising one or more tag readers, a processing module, and an output module. The tag readers are configured to read information from identification tags physically associated with one or more objects contained in the container. The processing module is configured to determine, for at least one object in the one or more objects, object-related information to be output for the at least one object based upon the information read from the identification tag physically associated with the at least one object. The output module is configured to output the object-related information determined for the at least one object.

According to another embodiment of the present invention, the processing module is configured to receive a search query that includes information specifying search criteria. The tag readers are configured to read information from identification tags physically associated with the one or more objects contained in the container. The processing module is further configured to determine, based upon the information read from the identification tags physically associated with the one or more objects, if the search criteria is satisfied by an object from the one or more objects. The output module is configured to output object-related information for an object from the one or more objects if it is determined that the search criteria is satisfied by the object.

According to yet another embodiment of the present invention, a container comprises one or more tag readers configured to read a first set of identification codes from identification tags physically associated with a first set of objects contained in the container, a processor, and a memory coupled to the processor, the memory configured to store a plurality of code modules for execution by the processor. The plurality of code modules comprise: a code module for comparing the first set of identification codes with a baseline set of identification codes to determine if an identification code is included in the first set of identification codes and not included in the baseline list of identification codes and if an identification code is included in the baseline set of identification codes and not included in the first list of identification codes, the baseline set of identification codes corresponding to a baseline set of objects; a code module for indicating that the container contains an object corresponding to an identification code that is not included in the baseline set of objects if the identification code is included in the first set of identification codes and is not included in the baseline set of identification codes; and a code module for indicating that an object corresponding to an identification code included in the baseline set of objects is not contained by the container if the identification code is included in the baseline set of identification codes and is not included in the first set of identification codes.

The foregoing, together with other features, embodiments, and advantages of the present invention, will become more apparent when referring to the following specification, claims, and accompanying drawings.

DETAILED DESCRIPTION OF THE INVENTION

Figure 1:
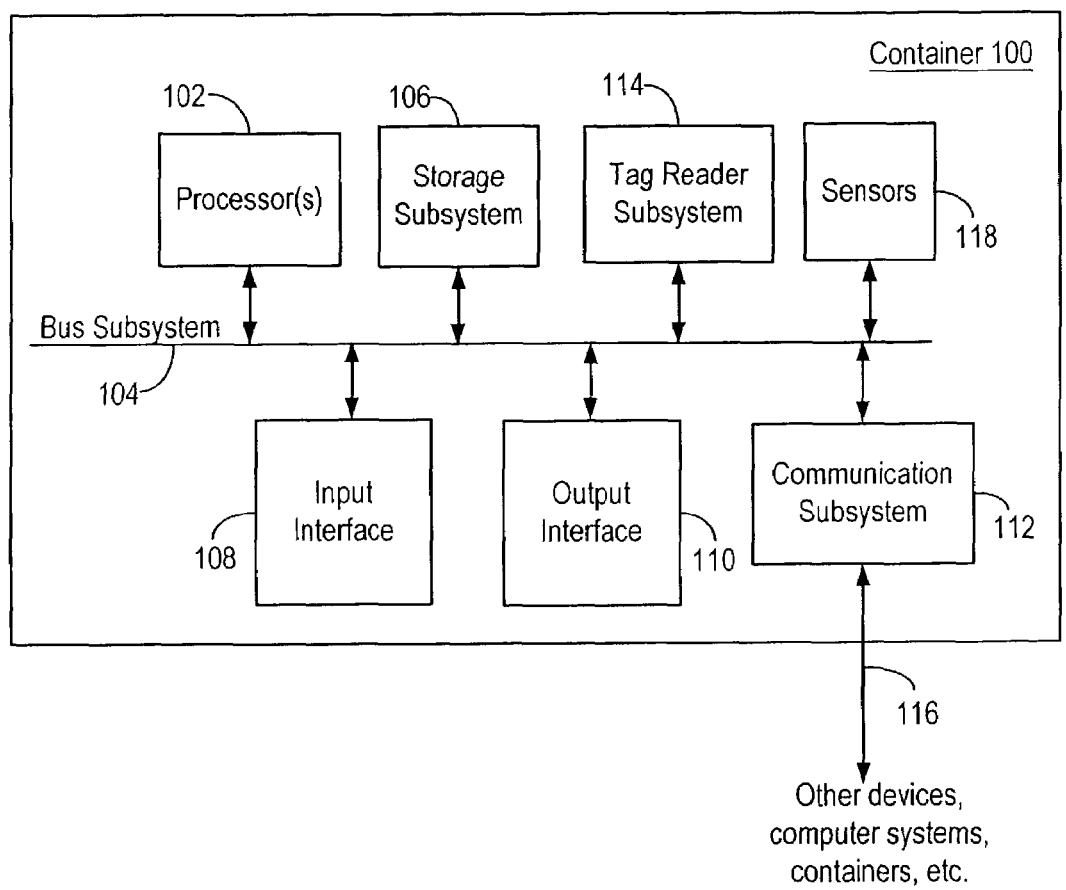
FIG. 1 is a simplified block diagram of a container according to an embodiment of the present invention.

Embodiments of the present invention provide a container that is capable of outputting information related to objects stored in the container. The container is able to output information for objects that are stored by the container and that have identification tags physically associated with them.

For purposes of this application, the term "container" is intended to refer to any area, receptacle or holder capable of containing, holding, or storing one or more objects. Examples of a container include a box, a briefcase, a bag, a case, a basket, a cabinet, a cupboard, portable containers, a shelf, a desk, and the like. Examples of objects that can be stored in a container include paper documents, books, magazines, pens, cups, and other physical objects.

As indicated above, for objects that are stored (or contained) in a container and have identification tags physically associated with them, the container is capable of outputting information related to the objects. According to an embodiment of the present invention, each identification tag that is physically associated with an object stores information related to the object. The information may include information that can be used to uniquely identify the object with which the identification tag is physically associated. For example, an identification tag may store an identification code that may be used to uniquely identify the object with which the identification tag is physically associated. It should be understood that other types of information that can be used to identify objects may also be stored in an identification tag in alternative embodiments of the present invention.

In addition to identification code information, other types of information related to an object may also be stored in an identification tag that is physically associated with the object. For example, if the object is a paper document, information that may be stored in an identification tag that is physically associated with the paper document may include an electronic representation of the contents of the paper document (e.g., a scanned image of the paper document, a Postscript format file or Portable Document Format (PDF) or image format or other file format, etc.), information identifying the author of the paper document, the date when the paper document was created, the number of pages in the paper document, and other like information. Other information that can be stored in an identification tag that is physically associated with a paper document is described in U.S. application Ser. No. 10/235,035, U.S. application Ser. No. 10/235,042, U.S. application Ser. No. 10/235,028, U.S. application Ser. No. 10/235,030, and U.S. application Ser. No. 10/234,414, the entire disclosures of which are herein incorporated by reference for all purposes.

According to the teachings of the present invention, a container may output information read from identification tags that are physically associated with one or more objects stored by the container. For example, the container may output identification code information read from the identification tags. For example, if the object is a paper document and the information read from an identification tag physically associated with the paper document includes an electronic representation (e.g., a scanned image) of the paper document, then the container may be configured to output the electronic representation.

Alternatively, the container may use the information read from the identification tags to determine additional information related to the objects stored by the container and output the additional information. For example, a container may use the identification code information read from an identification tag that is physically associated with a paper document to determine information identifying a storage location (e.g., a directory and filename) for an electronic representation of the paper document. The container may then output the storage location information.

In certain embodiments, a container may be configured to communicate the information read from identification tags physically associated with objects in the container to a data processing system. The data processing system may then output the information received from the container. The data processing system may also determine additional information based on the information received from a container and output the additional information. Depending upon the type of identification tag used, the information may be stored in the memory of the identification tag when the tag is manufactured, when the tag is activated, or at some later time using software or hardware techniques. For example, a paper document output device (e.g., a printer, copier, scanner, facsimile machine, etc.) may be configured to store a unique identification code in the memory of an identification tag that is physically associated with a paper document generated by paper document output device. Other information related to the paper document may also be stored in the identification tag by the paper document output device.

Various devices known to those skilled in the art may be used as identification tags. According to an embodiment of the present invention, each identification tag device includes an on-device memory that is capable of storing information. According to an embodiment of the present invention, radio frequency identification devices (RFIDs) are used as identification tags. For example, the Mu-chip manufactured by Hitachi, Ltd. may be used as an identification tag. The Mu-chip is a radio recognition IC chip that measures 0.4-mm square and is 60 microns thick in its present embodiment. The Mu-chip comprises an on-chip memory (presently a 128-bit ROM) that can be programmed to store information.

Various different techniques, including manual and automated techniques, may be used to physically associate an identification tag with an object. The identification tag may be permanently or temporarily attached to an object. Depending on the size of the identification tag, the identification tag may be embedded in the object. For example, due to its reduced size, a Mu-chip can be embedded in an object. For example, for a paper document object, a Mu-chip identification tag may be embedded in a paper page of the paper document. A paper page that has an identification tag embedded in it may be referred to as "tagged paper". Similarly, an identification tag may be embedded in other objects.

An identification tag may also be physically associated with an object by physically applying or attaching the identification tag to the object. For example, the tag may be attached to the object using clips, staples, adhesives, ties, strings, rubber bands, etc. The identification tag may also be incorporated into another object such as a staple, a clip, a label, etc. that is then attached to the object.

An identification tag may be physically associated with an object such that it is not directly visible to the unaided observer or user of the object. For example, as described above, an identification tag may be embedded in the object (e.g., a paper document comprising a tagged paper). If the object is a paper document, an identification tag may be mixed in the ink that is printed on the paper document.

FIG. 1 is a simplified block diagram of a container 100 according to an embodiment of the present invention. As shown in FIG. 1, container 100 includes a processor 102 that communicates with a number of peripheral subsystems via a bus subsystem 104. These peripheral subsystems may include a storage subsystem 106, an input interface 108, an output interface 110, a communication subsystem 112, a tag reader subsystem 114, and sensors 118. It should be understood that container 100 depicted in FIG. 1 is merely illustrative of an embodiment of the present invention and does not limit the scope of the present invention. One of ordinary skill in the art would recognize other variations, modifications, and alternatives.

Bus subsystem 104 provides a mechanism for letting the various components and subsystems of container 100 communicate with each other as intended. Although bus subsystem 104 is shown schematically as a single bus, alternative embodiments of the bus subsystem may utilize multiple buses.

Input interface 108 allows user interaction with container 100. A user may be a human user, a device, a process, a computer, another container, and the like. Input interface 108 may be implemented using a touch pad, a touch screen, mechanical buttons, audio input devices such as voice recognition systems, microphones, and other types of input devices. In general, input interface 108 includes all possible techniques to input information to container 100.

Output interface subsystem 110 provides an interface for outputting information from container 100. Output interface subsystem 110 may include a display subsystem such as a flat-panel device (e.g., a liquid crystal display (LCD), non-visual display devices such as audio output devices, and the like. According to the teachings of the present invention, information related to the objects contained in container 100 may be output via output interface 110.

Communication subsystem 112 facilitates transfer of information to and from container 100. Communication subsystem 112 thus provides an interface to computer systems, other containers, and devices that may be coupled to container 100 via communication link 116. Embodiments of communication subsystem 112 include an Ethernet card, a modem (telephone, satellite, cable, ISDN, etc.), (asynchronous) digital subscriber line (DSL) units, a jack, and the like.

Communication links 116 depicted in FIG. 1 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Tag reader subsystem 114 comprises one or more tag readers that are configured to read information from identification tags physically associated with objects stored or contained in container 100. The information that is read by the tag readers from the identification tags may include identification code information and other information related to objects contained in container 100. The tag readers are appropriately positioned in container 100 such that they can detect and read (or obtain) information stored by identification tags physically associated with objects contained in container 100.

The type of tag readers used and the technique used by the tag readers to read the information stored on an identification tag depends on the type of identification tag used. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

For example, in its present embodiment, information stored by a Hitachi Mu-chip can be read by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader. Accordingly, if a Hitachi Mu-chip is used as an identification tag, tag readers included in tag subsystem 114 may be constructed to expose the Mu-chip to 2.45 GHz band of microwaves and to detect and read radio waves emanating from the Mu-chip. Various other types of tag readers that are capable of detecting electromagnetic, optical, acoustical, or other signals may be used in alternative embodiments of the present invention using other forms of identification tags.

Processor 102 is configured to execute software modules that control and coordinate functioning of the various subsystems of container 100. Processor 102 is also configured to execute software code modules and control programs that control operation of container 100 in accordance with the teachings of the present invention. For example, software modules executed by processor 102 may determine additional information related to the objects based upon identification code information read by the tag readers from identification tags physically associated with one or more objects contained in container 100. The software code modules and control programs executed by processor 102 may be stored in storage subsystem 106.

Storage subsystem 106 is configured to store the basic programming and data constructs that provide the functionality of container 100. For example, software modules and control programs implementing the functionality of container 100 may be stored in storage subsystem 106. Storage subsystem 106 may also provide a repository for storing information used or generated by container 100 according to the teachings of the present invention. For example, information used to determine additional information about the objects may be stored in storage subsystem 106.

Sensors 118 may include one or more sensors that can sense or detect environment events and conditions associated with container 100. For example, sensors 118 may include Global Positioning System (GPS) sensors that can detect the location of container 100, sensors (e.g., solid state gyroscopes) that can detect motion of container 100, sensors that can detect physical pressure applied to container 100 (e.g., to determine if something is stacked onto container 100), sensors that can detect humidity, temperature sensors, photoelectric sensors, MEMS (Micro Electro Mechanical Systems) sensors (such as sensors provided by Systron Donner Inertial Division (SDID), a BEI Sensors & Systems Company) and other sensors known to those skilled in the art. These sensors are available from various suppliers such as Honeywell, Inc., and others.

The data collected from sensors 118 over time may be used to build an environmental profile of container 100. The environmental data may be stored by container 100. The environmental data can be accessed and/or queried by a user of container 100. A remote user may access the environmental data via communication subsystem 112. According to an embodiment of the present invention, the environmental data (or portions thereof) may be stored in identification tags physically associated with objects contained in container 100. A subsystem of container 100 may be configured to store the data in the identification tags.

Container 100 itself can be of various types including a box, a briefcase, a bag, a case, a basket, a cabinet, a cupboard, and the like. The description of container 100 depicted in FIG. 1 is intended only as a specific example for purposes of illustrating an embodiment of the computer system. Many other configurations of container 100 having more or fewer components than that depicted in FIG. 1 are possible.

Figure 2:
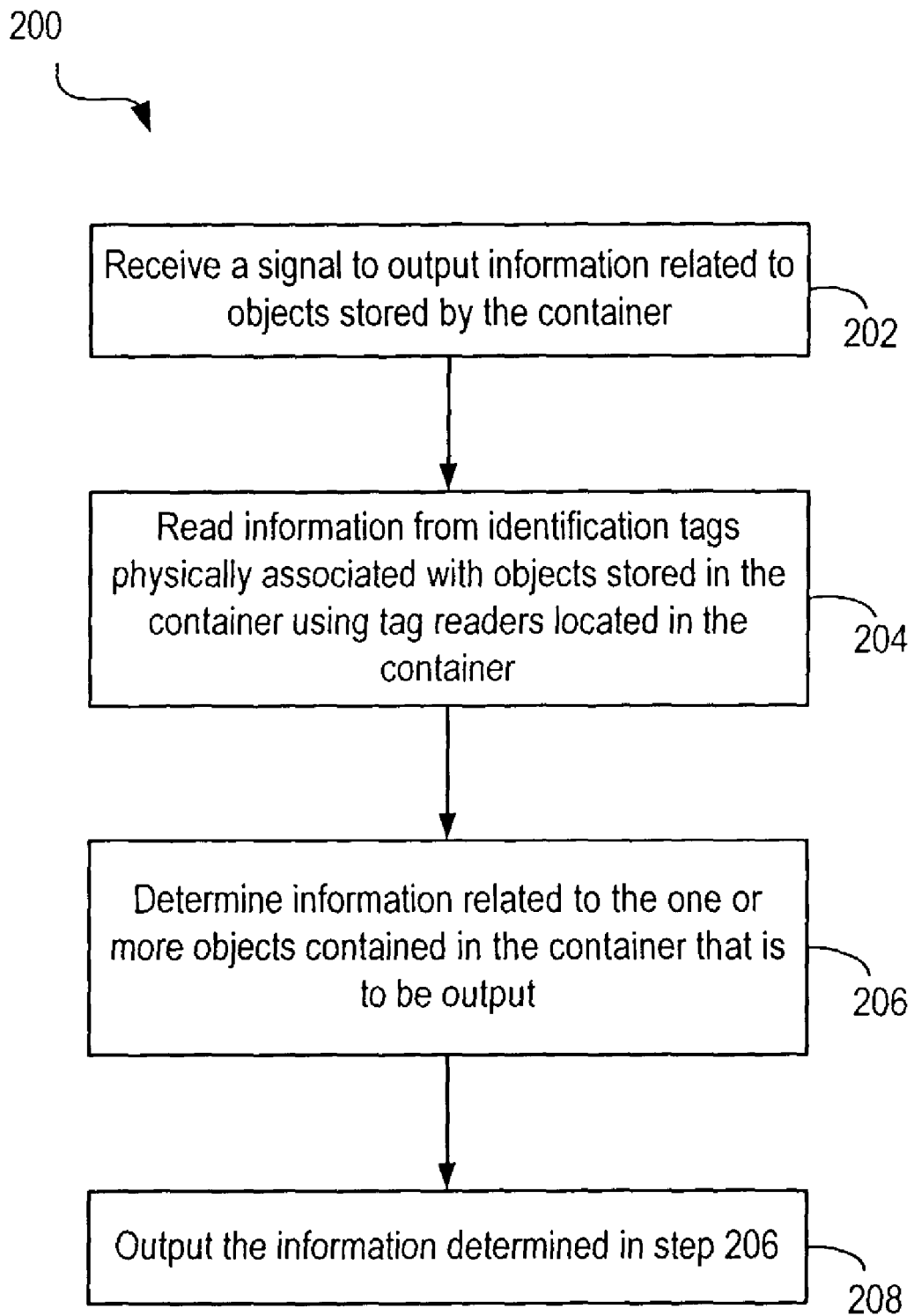
FIG. 2 is a simplified high-level flowchart depicting a method of outputting information related to objects stored or contained in a container according to an embodiment of the present invention.

According to the teachings of the present invention, container 100 is configured to output information related to objects stored or contained in container 100. FIG. 2 is a simplified high-level flowchart 200 depicting a method of outputting information related to objects stored or contained in container 100 according to an embodiment of the present invention. The method depicted in FIG. 2 may be performed by software modules executed by processor(s) of container 100, by hardware modules coupled to container 100, or combinations thereof. Flowchart 200 depicted in FIG. 2 is merely illustrative of an embodiment incorporating the present invention and does not limit the scope of the invention. One of ordinary skill in the art would recognize variations, modifications, and alternatives.

As depicted in FIG. 2, the method is initiated when container 100 receives a signal to output information related to objects stored by container 100 (step 202). The signal may be received from a variety of different sources. According to an embodiment of the present invention, the signal may be received from input interface 108 of the container. For example, input interface 108 may provide an input device (e.g., a button) that a user may select (e.g., user may activate or press a button) to generate a signal causing container 100 to output information related to objects stored by container 100. The signal may also be received from devices, computer systems, or other containers remotely situated from container 100 and that may be coupled to container 116 via communication link 116. Container 100 may receive the signal from these remote devices via communication link 116.

The signal in step 202 may also be received from applications or programs executed by container 100. For example, container 100 may execute a timer application that is configured to generate the signal at periodic time intervals. The signal received in step 202 may also be generated when a software program executing on container 100 detects the occurrence of a particular event. For example, container 100 may be configured to execute a calendar program or a scheduling software program. These programs may be configured to generate the signal upon the occurrence of a particular date, at a particular time, upon the occurrence of a user-configurable event, etc.

Information from identification tags physically associated with objects stored in container 100 is then read using the tag readers included in tag reader subsystem 114 (step 204). The information read from each identification tag physically associated with an object may include identification code information and other information related to the object. The other information related to the object may include information descriptive of the object. For example, the other information may include information identifying the object, information describing characteristics of the object such as the color of the object, the manufacturer of the object, the user of the object, and other like information.

For example, if the object is a paper document, the information stored in an identification tag physically associated with the paper document may comprise a representation of the contents of the particular paper document (e.g., scanned images of the paper document, electronic document corresponding to the paper document), information identifying the paper document (e.g., title of the paper document, etc.), information identifying an electronic representation of the paper document (e.g., a filename, directory location, etc.), information identifying another document related to the paper document, and the like. It should be understood that based upon the type of an object, various different kinds of information may be stored in the identification tag physically associated with the object and read by tag subsystem 114 in step 204.

Container 100 then determines the information related to the one or more objects contained in container 100 that is to be output (step 206). According to an embodiment of the present invention, for an object contained in container 100, the object-related information to be output includes information read from an identification tag physically associated with the object in step 204 or a portion thereof. For example, if the information read from the identification tag includes an identification code, the identification code may be selected to be output.

In alternative embodiments, the information read in step 204 from an identification tag physically associated with an object contained in container 100 may be used to find additional information related to the object. For example, according to an embodiment of the present invention, if the information read in step 204 from an identification tag physically associated with an object contained in container 100 includes a unique identification code associated with object, the identification code may be used to determine additional information related to the object.

The additional information may be determined from a plurality of sources including databases, tables, data structures, etc. As described in the applications that have been incorporated by reference, for paper document objects, information identifying a plurality of identification codes identifying paper documents and information associated with the plurality of identification codes may be stored in a paper document tracking database. The information associated with each identification code in the paper document tracking database may include information indicating a storage location of an electronic representation of the paper document, information identifying a physical location of the paper document, information identifying actions that have been performed on the paper document, electronic representation of the paper document, information identifying attributes (e.g., author, number of pages, etc, title, etc.) of the paper document, and other information. Likewise, other databases may store information associated with identification codes identifying other types of objects.

Container 100 may use information stored in databases such as the paper document tracking database to determine additional information related to the objects. Based upon the identification code read from an identification tag physically associated with an object in step 204, container 100 may determine the information corresponding to the identification code from the databases. The additional information determined by container 100 or a portion thereof may be included in the object-related information that is selected in step 206 to be output by container 100.

The databases (e.g., paper document tracking database) storing additional information related to the objects may be stored by container 100 (e.g., in storage subsystem 106). Alternatively, container 100 may access information stored in these databases via communication link 116.

Container 100 then outputs the information determined in step 206 (step 208). According to an embodiment of the present invention, the information is output via output interface 110. For example, the information may be output via a flat screen on the container.

In alternative embodiments, container 100 may communicate the information determined in step 206 to an external device, system, or to another container via communication link 116. The external device, system, or the other container may then output the information.

In alternative embodiments, after reading the information from identification tags in step 204, container 100 may be configured to communicate the information to a data processing system using communication subsystem 112. The data processing system may then determine the information to be output to the user (i.e., step 206 may be performed by the data processing system). The data processing system may then output the information per step 208. In these embodiments, the data processing system 102 may determine additional information related to the objects based upon the information received from a container. The additional information or portions thereof may be output to the user.

According to an embodiment of the present invention, the information output by container 100 may enable a user of container 100 to find out information related to objects stored in container 100 in a convenient and simple manner. The information enables a user of the present invention to determine identity of objects stored in the container. For example, as described above, according to an embodiment of the present invention, a user may press a button provided by input interface 108 of container 100, and in response descriptive information related to objects stored by the container is output to the user via output interface 110.

A user located at a remote location may also receive information related to the contents of container 100. The remote user may send a signal to container 100 via communication link 116 and in response information related to objects stored by the container is communicated to the remote user by the container via communication link 116. In this manner, a remotely located user can search and determine information related to objects stored by a container 100 in a convenient manner.

Figure 3:
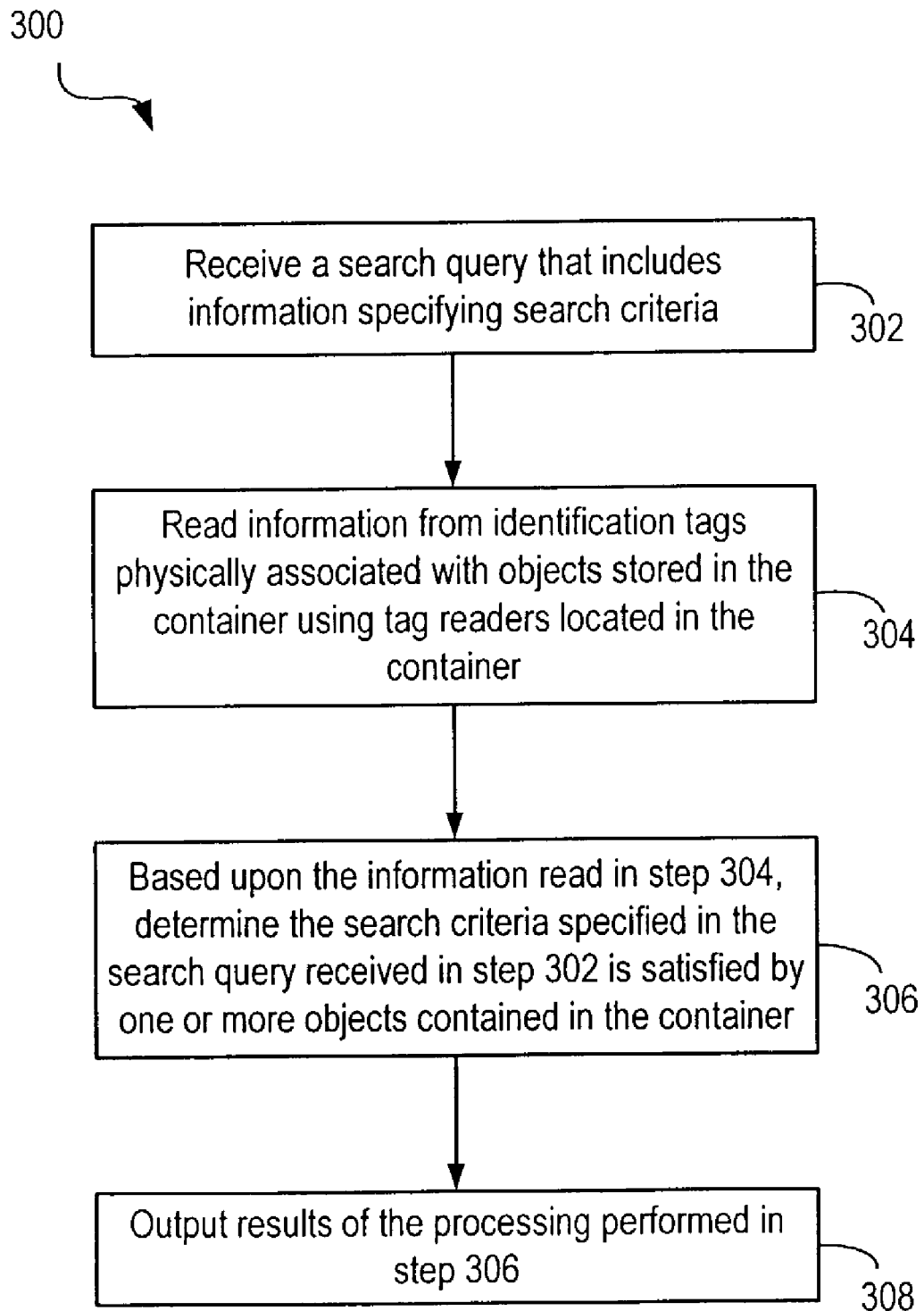
FIG. 3 is a simplified high-level flowchart depicting a method of responding to a search query according to an embodiment of the present invention.

Container 100 may also respond to search queries received from users. According to an embodiment of the present invention, a search query received by container 100 comprises information identifying search criteria related to one or more objects. Container 100 is configured to respond to the search query by outputting information indicating whether or not the search criteria specified in the search query is satisfied based upon objects stored by the container. FIG. 3 is a simplified high-level flowchart 300 depicting a method of responding to a search query according to an embodiment of the present invention. The method may be performed by software modules executed by processor 102 of container 100, by hardware modules coupled to container 100, or combinations thereof. Flowchart 300 depicted in FIG. 3 is merely illustrative of an embodiment incorporating the present invention and does not limit the scope of the invention. One of ordinary skill in the art would recognize variations, modifications, and alternatives.

As depicted in FIG. 3, processing is initiated when container 100 receives a search query that includes information specifying search criteria (step 302). The search query may be received from various different sources. According to an embodiment of the present invention, a user of container 100 may configure the search query using input interface 108. The search query may also be received from devices, computer systems, or other containers remotely situated from container 100 and coupled to container 100 via communication link 116. The search query may also be received from applications or programs executed by container 100.

Search criteria of different types may be specified in a search query. According to an embodiment of the present invention, the search criteria identifies an object and the search query requests container 100 to determine if the specified object is stored in container 100. For example, the search query may request container 100 to determine if container 100 contains "a calculator". The search criteria may also specify one or more characteristics of an object and the search query may request container 100 to determine if container 100 contains one or more objects satisfying the specified characteristics. For example, the search query may request container 100 to determine if container 100 contains a paper document entitled "Company Re-organization Plan".

Information from identification tags physically associated with objects stored in container 100 is then read using tag reader subsystem 114 (step 304). As described above, the information read from each identification tag physically associated with an object contained in container 100 may include identification code information and other information related to the object.

Based upon the information read in step 304, container 100 then determines if one or more objects stored in container 100 satisfy the search criteria specified in the search query received in step 302 (step 306). According to an embodiment of the present invention, the information read in step 304 is used to determine if the search criteria is satisfied by one or more objects stored by the container. In alternative embodiments, the information read in step 304 is used to determine additional information related to the objects. The additional information may be used to determine if one or more objects stored in container 100 satisfy the search criteria specified in the search query received in step 302.

Container 100 may employ various types of processing in step 306 to determine if an object stored in container 100 satisfies the search criteria. For example, if the search query requests if "a calculator" is contained in container 100, container 100 may determine if the information read from the identification tags physically associated with objects in container 100 or the additional information determined based on the identification codes information indicates that an object in the container is a calculator.

If the search query identifies a characteristic of an object (e.g., the title of a paper document), container 100 may determine if the information read from the identification tags physically associated with objects in container 100 or the additional information indicates if an object in container 100 possesses the specified characteristic. For example, if the search query specifies a title of a paper document, and the information read from the identification tags physically associated with objects in container 100 or the additional information determined by container 100 includes one or more scanned images of paper documents, then image processing techniques may be applied to the scanned images to determine if any of the scanned images has the specified title.

Results of the processing performed in step 306 are then output to the user (step 308). The information that is output may indicate whether or not the search criteria were satisfied. The information that is output may also identify the one or more objects that satisfied the search criteria. For example, if the search query specifies a title of a paper document, the information output in step 308 may indicate if a paper document with the specified title is contained in container 100. Information related to the document with the specified title may also be output.

The information in step 308 may be output via output interface 110 of container 100. Alternatively, container 100 may communicate the information to a data processing system that was the origination point of the search query via communication link 116.

According to an embodiment of the present invention, container 100 may also be configured to track objects that are inserted or removed from container 100 relative to a baseline list of objects. A user may provide information specifying the baseline list of objects to container 100. For example, a user may provide information related to the baseline list of objects using input interface 108 of container 100. The baseline list information may also be communicated to container 100 via communication link 116.

Objects in the baseline list may be identified using various techniques. According to an embodiment of the present invention, the objects may be identified using identification codes stored in identification tags that are physically associated with the objects. For example, a list of identification codes identifying the baseline list of objects may be provided to container 100.

Figure 4:
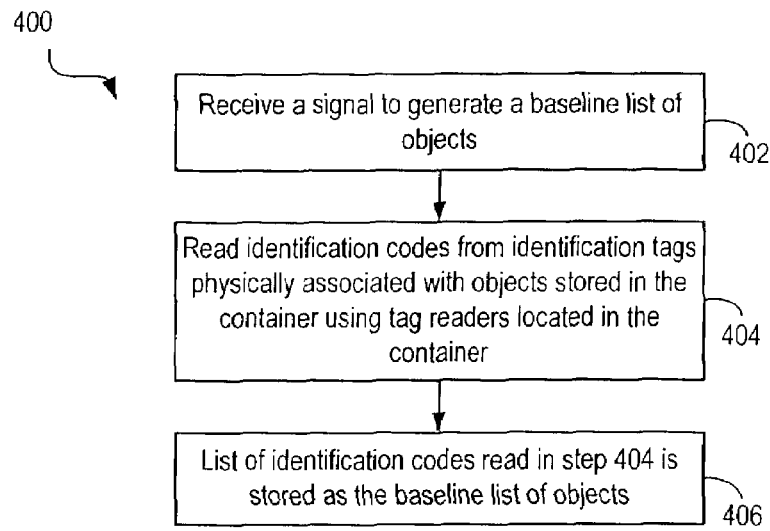
FIG. 4 is a simplified high-level flowchart depicting a method of generating a baseline list of objects stored by a container according to an embodiment of the present invention.

In alternative embodiments of the present invention, container 100 may be configured to automatically generate the baseline list of objects based upon objects stored by the container. FIG. 4 is a simplified high-level flowchart 400 depicting a method of automatically generating a baseline list of objects stored by container 100 according to an embodiment of the present invention. The method may be performed by software modules executed by processor 102 of container 100, by hardware modules coupled to container 100, or combinations thereof. Flowchart 400 depicted in FIG. 4 is merely illustrative of an embodiment incorporating the present invention and does not limit the scope of the invention as recited in the claims. One of ordinary skill in the art would recognize variations, modifications, and alternatives.

As depicted in FIG. 4, processing is initiated when container 100 receives a signal to generate a baseline list of objects (step 402). The signal may be received from a variety of different sources. According to an embodiment of the present invention, the signal may be received from a user using input interface 108. For example, input interface 108 may provide an input device (e.g., a button) that a user may select (e.g., user may activate or press a button) instructing container 100 to generate a baseline list of objects based upon objects contained in container 100. The signal in step 402 may also be received from devices, computer systems, or other containers remotely situated from container 100 and coupled to container 100 via communication link 116. The signal may also be received from applications or programs executed by container 100.

In response to the signal, tag readers included in tag reader subsystem 114 of container 100 are used to read or obtain identification code information from identification tags physically associated with objects contained in container 100 (step 404). According to an embodiment of the present invention, each identification code read from an identification tag uniquely identifies the object with which the identification tag is physically associated. The list of one or more identification codes read in step 404 thus represents a list of objects stored by container 100.

The list of identification codes is then stored as the baseline list of objects (step 406). The baseline list information may be stored by container 100 (e.g., stored in storage subsystem 106 of container 100) or may be communicated by container 100 to a remote system coupled to container 100 via communication link 116. The remote system may then store the baseline list information.

Figure 5:
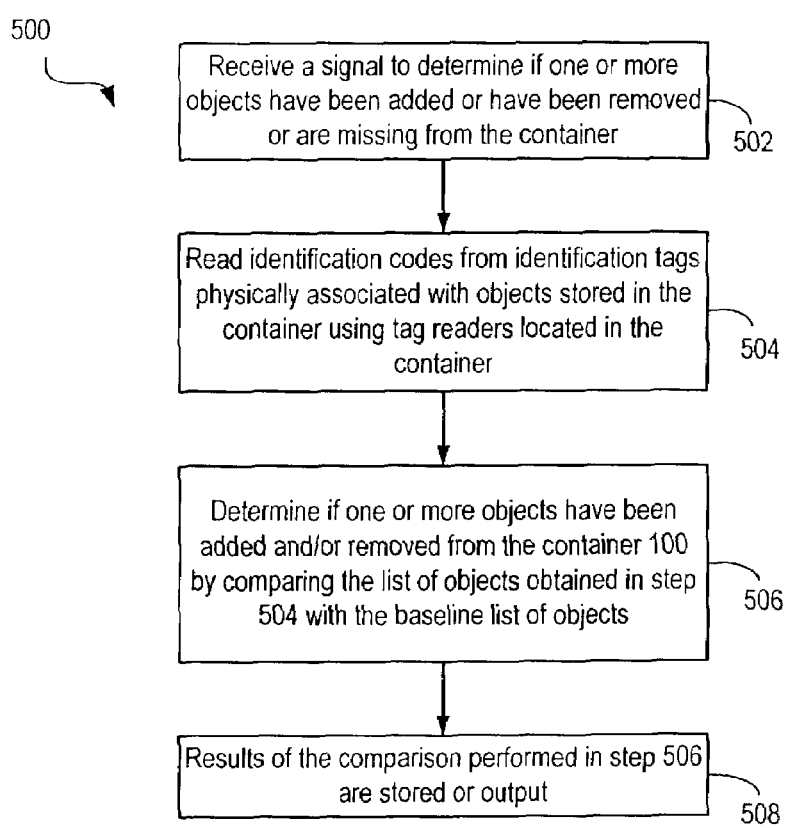
FIG. 5 is a simplified high-level flowchart depicting a method of determining if one or more objects have been added, removed, or are missing from a container according to an embodiment of the present invention.

The baseline list of objects is then used by container 100 to determine if one or more objects have been added or have been removed (or are missing) from container 100. FIG. 5 is a simplified high-level flowchart 500 depicting a method of determining if one or more objects have been added, removed, or are missing from container 100 according to an embodiment of the present invention. The method may be performed by software modules executed by processor 102 of container 100, by hardware modules coupled to container 100, or combinations thereof. Flowchart 500 depicted in FIG. 5 is merely illustrative of an embodiment incorporating the present invention and does not limit the scope of the invention as recited in the claims. One of ordinary skill in the art would recognize variations, modifications, and alternatives.

As depicted in FIG. 5, processing is initiated when container 100 receives a signal to determine if one or more objects have been added or have been removed or are missing from container 100 (step 502). The signal may be received from a variety of different sources. According to an embodiment of the present invention, the signal may be received from a user using input interface 108. For example, input interface 108 may provide an input device (e.g., a button) that a user may select (e.g., user may activate or press a button) to generate a signal instructing container 100 to determine if one or more objects have been added or have been removed or are missing from container 100 relative to the baseline list of objects. The signal in step 502 may also be received from devices, computer systems, or other container remotely situated from container 100 and coupled to container 100 via communication link 116. The signal may also be received from applications or programs executed by container 100. For example, an application executed by processor 102 may generate the signal at periodic time intervals.

In response to the signal, the tag readers that are included in tag reader subsystem 114 are used to read identification code information from identification tags physically associated with objects contained in container 100 (step 504). The list of one or more identification codes read in step 504 represents a list of objects presently stored by container 100.

The list of objects obtained in step 504 is then compared with the baseline list of objects to determine if one or more objects have been added to container 100 or are missing from container 100 relative to the baseline list of objects (step 506). If a particular identification code is included in the baseline list but is not included in the list of identification codes obtained in step 504, it indicates that an object corresponding to the particular identification code has been removed or is missing from container 100 relative to the baseline list of objects. If a particular identification code is not included in the baseline list but is included in the list obtained in step 504, it indicates that an object corresponding to the particular identification code has been added to container 100 relative to the baseline list of objects. If the identification codes read in step 504 and the identification codes listed in the baseline list of objects are the same, it indicates that no object has been added or removed from container 100.

The results of the comparison performed in step 506 are then either stored or output to the user (step 508). According to an embodiment of the present invention, if it is determined in step 506 that one or more objects have been added or removed (or are missing) from container 100 relative to the baseline list of objects, then identification codes corresponding to the added or removed objects may be output to the user. Other information related to or descriptive of the added or removed objects may also be output along with the identification codes information. The other object-related information may be read from the identification tags or may be determined from object databases accessible to container 100.

As described above, container 100 can be configured to output information indicating whether one or more objects have been added and/or are missing from a container relative to a baseline list of objects. For example, if container 100 is embodied as a briefcase, the user of the briefcase may, before leaving for work, push a button on the briefcase that causes the briefcase to generate a baseline list of objects (e.g., pens, pencils, paper documents, PDAs, etc.) contained in the briefcase. Later, before coming back home from work, the user may push another button on the briefcase that causes the briefcase to automatically output information about objects that have been added or removed from the briefcase relative to the baseline list of objects. An alert may be output if an object is missing. In this manner, the user can easily and conveniently determine if any objects are missing or have been added to the user's briefcase.

As another example, if container 100 is embodied as a toolbox, a user of the toolbox may push a button on the toolbox that causes generation of a baseline list of objects (e.g., tools, etc.) contained in the toolbox. The user may then push another button on the toolbox at some later time to automatically receive information about objects that have been added or removed from the toolbox relative to the baseline list of objects. In this manner, the user can easily and conveniently determine if any objects are missing from the toolbox.

According to an embodiment of the present invention, container 100 maintains a running history log of object additions and/or removals from container 100. In this embodiment, container 100 periodically reads identification code information from identification tags physically associated with objects contained in container 100 and uses the information read at periodic time intervals to determine when objects were added or removed from container 100.

Figure 6:
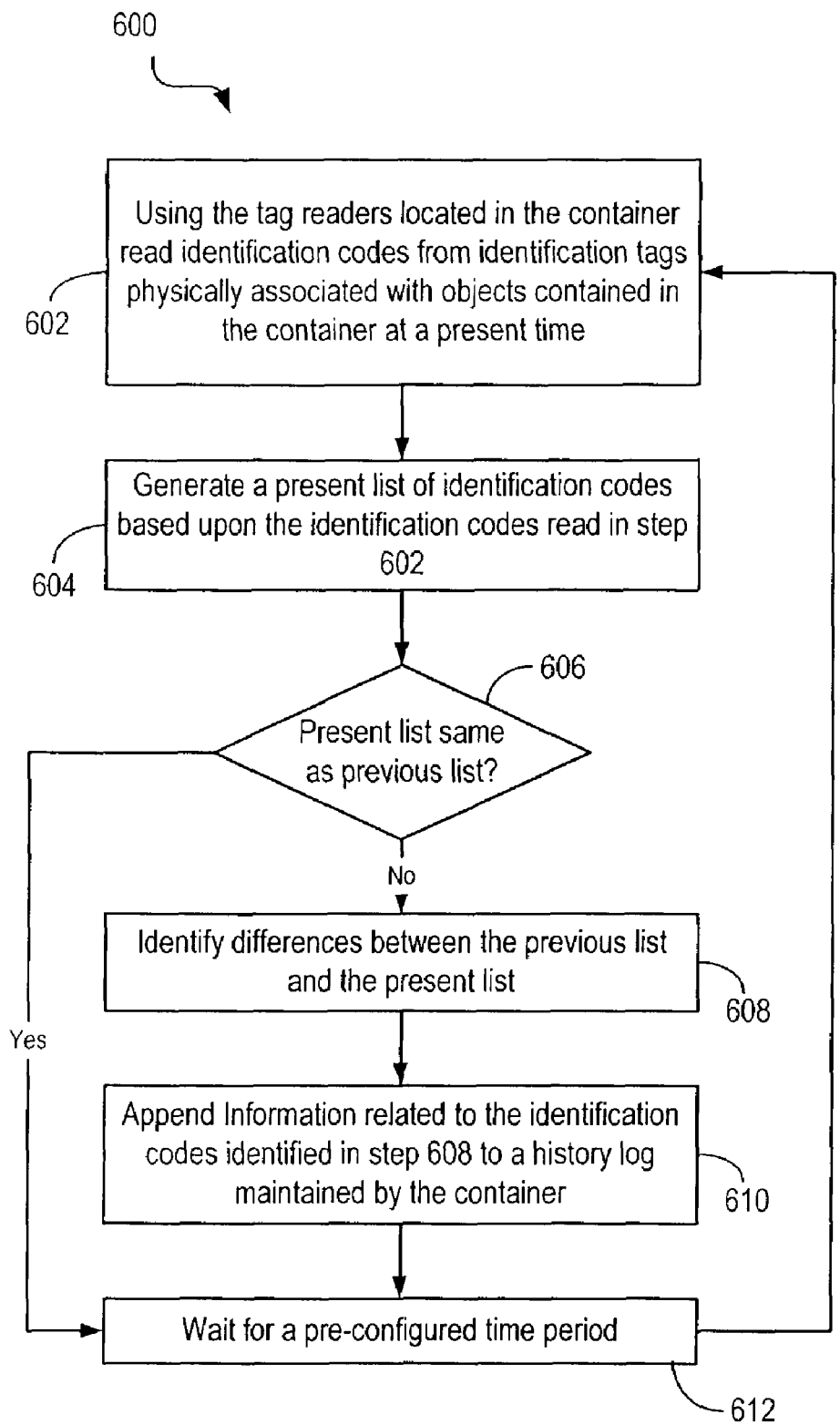
FIG. 6 is a simplified high-level flowchart depicting a method of determining when an object was added or removed from a container by periodically reading identification code information from identification tags physically associated with objects contained in the container according to an embodiment of the present invention.

FIG. 6 is a simplified high-level flowchart 600 depicting a method of determining when an object was added or removed from container 100 by periodically reading identification code information from identification tags physically associated with objects contained in container 100 according to an embodiment of the present invention. The method may be performed by software modules executed by processor 102 of container 100, by hardware modules coupled to container 100, or combinations thereof. Flowchart 600 depicted in FIG. 6 is merely illustrative of an embodiment incorporating the present invention and does not limit the scope of the invention as recited in the claims. One of ordinary skill in the art would recognize variations, modifications, and alternatives.

As depicted in FIG. 6, tag readers included in tag reader subsystem 114 are used to read identification code information from identification tags physically associated with objects contained in container 100 at a present time (step 602). A list of identification codes is then generated based upon the information read in step 602 (step 604). The list (referred to as the "present list") of one or more identification codes represents a list of objects stored by container 100 at the present time. A time stamp corresponding to the present time may be associated with the list generated in step 604.

The list of identification codes generated in step 604 is then compared with a previously generated list of identification codes to determine if there are any differences between the present list and the previous list (step 606). The previously generated list is a list generated at a previous time when the identification tags were scanned (referred to as the "previous list", where "previous time"="present time"−Δt, for some user-configurable Δt). If there is no difference between the identification codes listed in the previous list and identification codes listed in the present list, it indicates that no object has been added and/or removed from container 100 in the time interval between when the previous list was generated (the "previous time") and the time when the present list was generated (the "present time") (i.e., during the time interval from "previous time" to "present time"). In such a scenario processing continues with step 612.

If there is a difference between the identification codes listed in the previous list and identification codes listed in the present list, it indicates that one or more objects have been added and/or removed from container 100 in the time interval between the present time and the previous time. The differences between the previous list and the present list are identified (step 608). Accordingly, in step 608, container 100 identifies identification codes that are included in the previous list but not in the present list and identification codes that are included in the present list but are not included in the previous list. If a particular identification code is included in the previous list but is not included in the present list, it indicates that an object corresponding to the particular identification code has been removed from container 100 in the time interval between when the previous list was generated and the time when the present list was generated. If a particular identification code is not included in the previous list but is included in the present list, it indicates that an object corresponding to the particular identification code has been added to container 100 in the time interval between when the previous list was generated and the time when the present list was generated.

Information related to the identification codes identified in step 608 is then appended to a history log maintained by container 100 (step 610). For each identification code, information indicating whether an object corresponding to the identification code was removed or added to container 100 and the time interval (i.e., the time interval between the present time and previous time) when the addition or removal occurred is also stored in the history log.

After updating the history log according to step 610 and after waiting for a pre-configured time period (step 612), processing continues with step 602 wherein the next periodic scan of the identification tags contained in container 100 is performed. The method depicted in FIG. 6 is then repeated. The time period (Δt) between successive reads of the identification tags may be user-configurable.

In the manner described above, container 100 maintains a running history log of additions and removals of objects from container 100. Information from the history log or portions thereof can be output to the user. For example, a user of container 100 may specify a particular time period (e.g., an hour, a day, a week, etc.), and information from the history log indicating additions and removals of objects from container 100 for the user-specified time period may be output to the user.

Information from the history log may also be used to augment the information output to the user in step 508 of flowchart 500 depicted in FIG. 5. For example, for each object that has been added or removed from container 100 relative to the baseline list of objects, information indicating when the object was added or removed from container 100 may also be output to the user based upon information stored in the history log.

In other embodiments, container 100 may be configured to output an alarm signal to the user whenever container 100 senses than an object has been removed from container 100. The alarm signal may be output to the user via output interface 110. The alarm signal may comprise information identifying the object that is missing from container 100. In alternative embodiments, container 100 may be configured to output the alarm signal only when container 100 senses that certain user-specified objects have been removed from container 100.

According to an embodiment of the present invention, information regarding additions and removals of objects from container 100 may be written to the identification tags that are physically associated with the objects. For example, every time that a scan of the objects in container 100 is performed, information may be stored in the identification tags of the objects in container 100 indicating the time the scan was performed and information indicating that the object was sensed to be contained in container 100. In this manner a history of when the object was in container 100 is stored on the object's identification tag. A user can then determine when an object was added or removed from container 100 from information stored in the object's identification tag—no network connection or retrieval from a central database is required.

In alternative embodiments of the present invention, container 100 may comprise an object motion sensing subsystem that can sense when an object is added or removed from container 100. By detecting motion of an object, the object motion sensing subsystem can determine when an object is removed from container 100 or added to container 100. When a removal or addition of an object to container 100 is sensed, information may be stored in the identification tag that is physically associated with the object indicating the time and date when the addition or removal takes place, and indicating whether the object was added or removed. For example, an information such as the following may be stored in the identification tag that is physically associated with an object.

"Object removed from the container at 12:45 pm on Aug. 22, 2001"

The addition/removal information for an object detected by the object motion sensing subsystem may also be stored by container 100. In this manner a history of additions and removals of objects from container 100 is maintained. This history information may be accessed and/or queried by a user of container 100.

Container 100 may also be equipped with a camera that is capable of capturing an image of a user who removes or adds an object to container 100. The camera may be configured to capture a photo of a user every time an object is added or removed from container 100. In this embodiment, each entry in the addition/removal history log may be augmented with information identifying a user responsible for removing or adding an object to container 100. The camera may be included in sensors 118 of container 100.

Various other types of information related to objects contained in container 100 may also be stored by container 100 and/or written to identification tags physically associated with the objects. For example, security information as described in U.S. application Ser. No. 10/235,030 may be stored.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a portable container, the container comprising an input interface, a display, one or more tag readers, a memory, and a processor, the method comprising:

generating a signal upon activation of the input interface of the container;

responsive to the signal, reading information from one or more identification tags physically associated with one or more objects disposed in the container using the one or more tag readers, the information including, for an object from the one or more objects, one or more of a history of removal of the object from the container, a history of addition of the object to the container, and a time of reading of the information from the identification tag physically associated with the object;

determining, for each object in the one or more objects, object-related information for the object based upon the information read from the identification tag physically associated with the object and based upon information stored in the memory of the container; and displaying the object-related information determined for at least one object in the one or more objects using the display of the container;

wherein the method is autonomously performed by the container without requiring any external processing.

2. The method of claim 1 wherein displaying the object-related information determined for the at least one object comprises:

displaying a portion of the information read from the identification tag physically associated with the at least one object.

3. The method of claim 1 wherein determining the object-related information for each object in the one or more objects comprises:

for each object in the one or more objects:

determining an identification code from the information read from the identification tag physically associated with the object; and determining the object-related information to display for the object based upon the identification code read from the identification tag physically associated with the object.

4. The method of claim 3 wherein:

the information stored in the memory of the container comprises a plurality of identification codes and information associated with each identification code in the plurality of identification codes;

determining the object-related information for the object based upon the identification code read from the identification tag physically associated with the object comprises:

accessing the information stored in the memory of the container; and determining, from the information stored in the memory of the container, information associated with a first identification code from the plurality of identification codes that matches the identification code read from the identification tag physically associated with the object; and displaying the object-related information determined for the at least one object in the one or more objects comprises:

displaying a portion of the information associated with the first identification code, the portion including a time that the identification tag of the object was read.

5. A method performed by a portable container comprising an input interface, a display, and one or more tag readers, the method comprising:

receiving, via the input interface of the container, a search query that includes information specifying search criteria;

reading information from one or more identification tags physically associated with one or more objects disposed in the container using the one or more tag readers;

determining, based upon the information read from the one or more identification tags physically associated with the one or more objects, if the search criteria is satisfied by an object from the one or more objects; and displaying, via the display, object-related information for each of the objects in the one or more objects that satisfies the search criteria;

wherein the method is autonomously performed by the container without requiring any external processing.

6. The method of claim 5 wherein determining if the search criteria is satisfied by an object from the one or more objects comprises:

for each object in the one or more objects:

determining an identification code from the information read from the identification tag physically associated with the object; and determining if the object satisfies the search criteria based upon the identification code read from the identification tag physically associated with the object.

7. The method of claim 6 wherein determining if the object satisfies the search criteria comprises:

accessing first information identifying a plurality of identification codes and object-related information associated with each identification code;

determining, from the first information, object-related information associated with an identification code that matches the identification code read from the identification tag physically associated with the object; and determining if the object satisfies the search criteria based upon the object-related information associated with the matching identification code.

8. The method of claim 5 wherein:

the search criteria identifies a first object; and determining if the search criteria is satisfied by an object from the one or more objects comprises:

determining, based upon the information read from the identification tags physically associated with the one or more objects, if the first object is included in the one or more objects.

9. The method of claim 5 wherein:

the search identifies a first characteristic; and determining if the search criteria is satisfied by an object from the one or more objects comprises:

determining, based upon the information read from the identification tags physically associated with the one or more objects, if an object from the one or more objects possesses the first characteristic.

10. A method performed by a portable container of identifying addition or removal of objects from the container, the container comprising a display, one or more tag readers, and a memory, the method comprising:

reading a first set of identification codes from one or more identification tags physically associated with one or more objects disposed in the container using the one or more tag readers;

comparing the first set of identification codes with a baseline set of identification codes stored in the memory of the container, the baseline set of identification codes corresponding to a baseline set of objects;

indicating, via the display of the container, that at least one object not included in the baseline set of objects is disposed in the container if it is determined from the comparing that the first set of identification codes comprises at least one identification code that is not included in the baseline set of identification codes;

indicating, via the display of the container, that at least one object included in the baseline set of objects is not disposed in the container if it is determined from the comparing that the baseline set of identification codes comprises at least one identification code that is not included in the first set of identification codes; and storing a history of removal of an object from the container in the identification tag associated with the object, or a history of addition of an object to the container in the identification tag associated with the object;

wherein the method is autonomously performed by the container without requiring any external processing.

11. The method of claim 10 wherein indicating that at least one object not included in the baseline set of objects is disposed in the container comprises:

identifying a time interval when the at least one object was added to the container.

12. The method of claim 10 wherein indicating that at least one object included in the baseline set of objects is not disposed in the container comprises:

identifying a time interval when the at least one object was removed from the container.

13. A container comprising:

an input interface;
a processing module;
one or more tag readers; and
a display;

wherein the processing module is configured to receive a search query that includes information specifying search criteria, the search query input using the input interface;

wherein the one or more tag readers are configured to read information from one or more identification tags physically associated with one or more objects disposed in the container;

wherein the processing module is configured to determine, based upon the information read from the one or more identification tags physically associated with the one or more objects, if the search criteria is satisfied by an object from the one or more objects;

wherein the display is configured to output object-related information for each of the objects in the one or more objects that satisfies the search criteria;

wherein the container is portable.

14. The container of claim 13 wherein the processing module is configured to:

for each object in the one or more objects:
determine an identification code from the information read from the identification tag physically associated with the object; and
determine if the object satisfies the search criteria based upon the identification code read from the identification tag physically associated with the object.

15. The container of claim 14 wherein the processing module is configured to:

access first information identifying a plurality of identification codes and object-related information associated with each identification code;
determine, from the first information, object-related information associated with an identification code that matches the identification code read from the identification tag physically associated with the object; and
determine if the object satisfies the search criteria based upon the object-related information associated with the matching identification code.

16. The container of claim 13 wherein:
the search criteria identifies a first object; and
the processing module is configured to:
determine, based upon the information read from the identification tags physically associated with the one or more objects, if the first object is included in the one or more objects.

17. The container of claim 13 wherein:
the search criteria identifies a first characteristic; and
the processing module is configured to:
determine, based upon based upon the information read from the identification tags physically associated with the one or more objects, if an object from the one or more objects possesses the first characteristic.

18. A container comprising:
one or more tag readers configured to read a first set of identification codes from one or more identification tags physically associated with a first set of objects disposed in the container;
a display;
a processor; and
a memory coupled to the processor, the memory configured to store a baseline set of identification codes, the baseline set of identification codes corresponding to a baseline set of objects, the memory configured to store a plurality of code modules for execution by the processor, the plurality of code modules comprising:
a code module for comparing the first set of identification codes with the baseline set of identification codes;
a code module for indicating, via the display, that at least one object not included in the baseline set of objects is disposed in the container if the first set of identification codes comprises at least one identification code that is not included in the baseline set of identification codes;
a code module for indicating, via the display, that at least one object included in the baseline set of objects is not disposed in the container if the baseline set of identification codes comprises at least one identification code that is not included in the first set of identification codes; and
a code module for storing a status of removal of an object from the container in the identification tag associated with the object, or a status of addition of an object to the container in the identification tag associated with the object;
wherein the container is portable.

19. The container of claim 18 wherein the code module for indicating that at least one object not included in the baseline set of objects is disposed in the container comprises:
a code module for identifying a time interval when the at least one object was added to the container.

20. The container of claim 18 wherein the code module for indicating that at least one object included in the baseline set of objects is not disposed in the container comprises:
a code module for identifying a time interval when the at least one object was removed from the container.

21. A computer program product stored on a computer-readable storage medium and executed by a container comprising an input interface, a display, one or more tag readers, a memory, and a processor, the computer program product comprising:
code for generating a signal upon activation of the input interface of the container;
code for reading information from one or more identification tags physically associated with one or more objects disposed in the container using the one or more tag readers in response to the signal;
code for determining, for each object in the one or more objects, object-related information for the object based upon the information read from the identification tag physically associated with the object and based upon information stored in the memory of the container; and
code for displaying the object-related information determined for at least one object in the one or more objects using the display of the container;
wherein the container is human carriable.

22. The computer program product of claim 21 wherein the code for displaying the object-related information determined for the at least one object comprises:
code for displaying a portion of the information read from the identification tag physically associated with the at least one object.

23. The computer program product of claim 21 wherein the code for determining the object-related information for each object in the one or more objects comprises:
for each object in the one or more objects:
code for determining an identification code from the information read from the identification tag physically associated with the object; and
code for determining the object-related information to be displayed for the object based upon the identification code read from the identification tag physically associated with the object.

24. The computer program product of claim 23 wherein:
the code for determining the object-related information for the object based upon the identification code read from the identification tag physically associated with the object comprises:

code for accessing the information stored in the memory of the container, the information stored in the memory identifying a plurality of identification codes and information associated with each identification code in the plurality of identification codes; and code for determining, from the information stored in the memory of the container, information associated with a first identification code from the plurality of identification codes that matches the identification code read from the identification tag physically associated with the object; and the code for displaying the object-related information determined for the at least one object in the one or more objects comprises:

code for displaying a portion of the information associated with the first identification code.

25. A computer program product stored on a computer-readable storage medium and executed by a container comprising an input interface, a display, and one or more tag readers, the computer program product comprising:

code for receiving, via the input interface of the container, a search query that includes information specifying search criteria;

code for reading information from one or more identification tags physically associated with one or more objects disposed in the container using the one or more tag readers;

code for determining, based upon the information read from the one or more identification tags physically associated with the one or more objects, if the search criteria is satisfied by an object from the one or more objects;

code for displaying, via the display of the container, object-related information for each of the objects in the one or more objects that satisfies the search criteria; and code for storing a status of removal of an object from the container in the identification tag associated with the object, or a status of addition of an object to the container in the identification tag associated with the object;

wherein the container is portable.

26. The computer program product of claim 25 wherein the code for determining if the search criteria is satisfied by an object from the one or more objects comprises:

for each object in the one or more objects:
code for determining an identification code from the information read from the identification tag physically associated with the object; and
code for determining if the object satisfies the search criteria based upon the identification code read from the identification tag physically associated with the object.

27. The computer program product of claim 26 wherein the code for determining if the object satisfies the search criteria comprises:

code for accessing first information identifying a plurality of identification codes and object-related information associated with each identification code;

code for determining, from the first information, object-related information associated with an identification code that matches the identification code read from the identification tag physically associated with the object; and code for determining if the object satisfies the search criteria based upon the object-related information associated with the matching identification code.

28. The computer program product of claim 25 wherein:
the search criteria identifies a first object; and the code for determining if the search criteria is satisfied by an object from the one or more objects comprises:

code for determining, based upon the information read from the identification tags physically associated with the one or more objects, if the first object is included in the one or more objects.

29. The computer program product of claim 25 wherein:
the search criteria identifies a first characteristic; and
the code for determining if the search criteria is satisfied by an object from the one or more objects comprises:

code for determining, based upon based upon the information read from the identification tags physically associated with the one or more objects, if an object from the one or more objects possesses the first characteristic.

30. A computer program product stored on a computer-readable storage medium and executed by a container for identifying addition or removal of objects from the container, the container comprising a display, one or more tag readers, and a memory, the computer program product comprising:

code for reading a first set of identification codes from one or more identification tags physically associated with one or more objects disposed in the container using the one or more tag readers;

code for comparing the first set of identification codes with a baseline set of identification codes stored in the memory of the container, the baseline set of identification codes corresponding to a baseline set of objects;

code for indicating, via the display of the container, that at least one object not included in the baseline set of objects is disposed in the container if the first set of identification codes comprises at least one identification code that is not included in the baseline set of identification codes; and code for indicating, via the display of the container, that at least one object included in the baseline set of objects is not disposed in the container if the baseline set of identification codes comprises at least one identification code that is not included in the first set of identification codes;

wherein the container is human carriable.

31. The computer program product of claim 30 wherein the code for indicating that at least one object not included in the baseline set of objects is disposed in the container comprises:

code for identifying a time interval when the at least one object was added to the container.

32. The computer program product of claim 30 wherein the code for indicating that at least one object included in the baseline set of objects is not disposed in the container comprises:

code for identifying a time interval when the at least one object was removed from the container.

33. A container for displaying information, the container comprising:

means for generating a signal to display information related to the one or more objects disposed in the container;

means for reading information from one or more identification tags physically associated with one or more objects disposed in the container responsive to the signal;

means for determining, for each object in the one or more objects, object-related information for the object based upon the information read from the identification tag physically associated with the object and based upon information stored in a memory of the container;

means for displaying the object-related information determined for at least one object in the one or more objects; and means for storing a status of removal of an object from the container in the identification tag associated with the object, or a status of addition of an object to the container in the identification tag associated with the object;

wherein the container is portable.

34. A container comprising:

means for inputting a search query that includes information specifying search criteria;

means for reading information from one or more identification tags physically associated with one or more objects disposed in the container;

means for determining, based upon the information read from the one or more identification tags physically associated with the one or more objects, if the search criteria is satisfied by an object from the one or more objects; and means for displaying object-related information for an object from the one or more objects that satisfies the search criteria; and means for storing a status of removal of an object from the container in the identification tag associated with the object, or a status of addition of an object to the container in the identification tag associated with the object;

wherein the container is portable.

35. A container for identifying addition or removal of objects from a container, the container comprising:

means for reading a first set of identification codes from one or more identification tags physically associated with one or more objects disposed in the container;

means for storing a baseline set of identification codes, the baseline set of identification codes corresponding to a baseline set of objects;

means for comparing the first set of identification codes with the baseline set of identification codes;

means for indicating that at least one object not included in the baseline set of objects is disposed in the container if the first set of identification codes comprises at least one identification code that is not included in the baseline set of identification codes;

means for indicating that an object included in the baseline set of objects is not disposed in the container if the baseline set of identification codes comprises at least one identification code that is not included in the first set of identification codes; and means for storing a status of removal of an object from the container in the identification tag associated with the object, or a status of addition of an object to the container in the identification tag associated with the object;

wherein the container is portable.

* * * * *